June 23, 1936.    V. E. CARLSON    2,045,293
ELECTRIC MOTOR
Filed Aug. 20, 1932
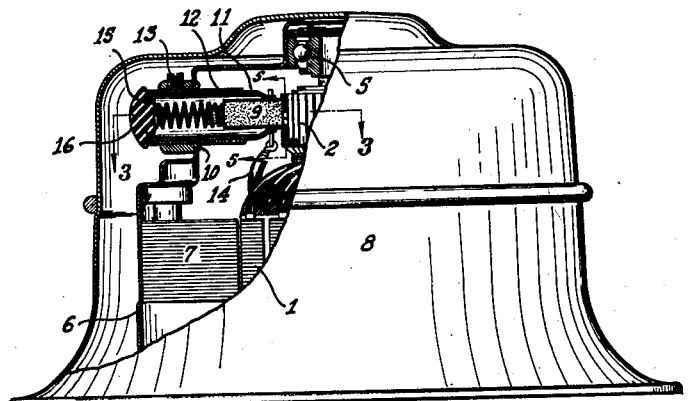
Fig. 1
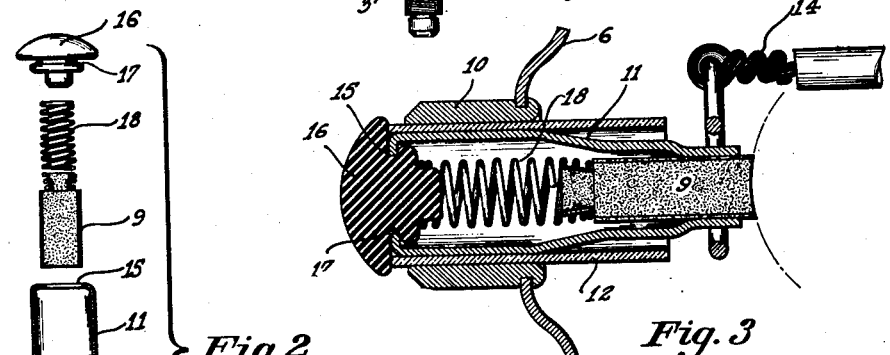
Fig. 2    Fig. 3
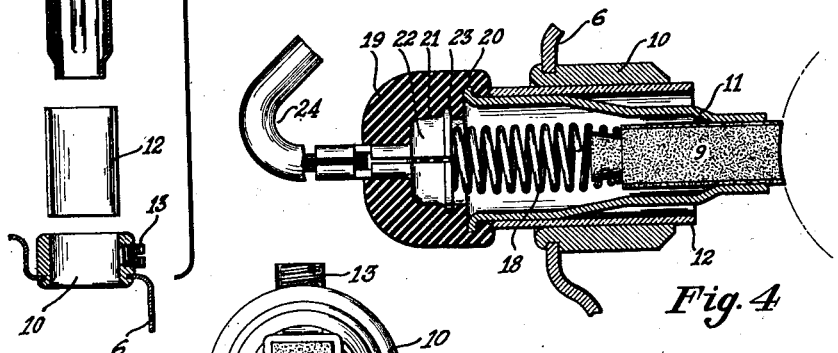
Fig. 4
Fig. 5
INVENTOR
Vernon E. Carlson
BY Harry S. Demaree
ATTORNEY Patented June 23, 1936

2,045,293

UNITED STATES PATENT OFFICE 2,045,293

ELECTRIC MOTOR

Vernon E. Carlson, Canton, Ohio, assignor to The Hoover Company, North Canton, Ohio, a corporation of Ohio Application August 20, 1932, Serial No. 629,654

4 Claims. (Cl. 171—324)

The present invention relates to electric motors and generators and more particularly to mounting means for the commutator brushes used in such machines. It is a primary object of the present invention to provide a brush holder which is so constructed that the current-carrying brush is easily positioned therein and removed therefrom. It is a further object to provide a brush mounting embodying a new and novel means of retaining the brush spring in position within the brush holder which will permit its easy removal and insure its ease of insertion. It is a still further object to provide an electric motor brush mounting in which certain parts are made of resilient material which is deformable to permit their insertion in or removal from the mounting construction. Other and more specific objects will appear upon reading the following specification and claims, and upon considering the accompanying drawing.

In the drawing, in which like reference characters refer to like parts in the various views, and which discloses preferred embodiments of the present invention:

Figure 1 is a side elevation, partly in section, disclosing the present invention embodied in an electric motor;

Figure 2 is an exploded view in elevation of the preferred embodiment disclosed in Figure 1;

Figure 3 is a section of the embodiment disclosed in Figure 1 being a view taken upon the section lines 3—3 of Figures 1 and 5;

Figure 4 is a section similar to Figure 3 showing a second preferred embodiment of the present invention;

Figure 5 is a section upon the line 5—5 of Figure 1.

Referring again to the drawing the present invention is shown embodied in an electric motor, the armature and commutator of which are indicated generally by the reference characters 1 and 2 respectively. The armature shaft 3 is rotatably mounted upon bearings 4 and 5 carried in the stator frame 6. The field 7 is carried by the frame 6 which is itself enclosed by the outer casing 8.

As in the usual motor or generator of the direct current type, current-carrying brushes are provided to conduct the current to the commutator 2 and so to the armature 1. In Figure 1 the brush 9 is shown in contact with the commutator 2. The stator frame 6 is provided with a seat 10 which houses the mounting for the brush, which mounting comprises a metallic holder or socket 11, the inner end of which is reduced in size so as to slidingly enclose the brush 9, and the outer enlarged end portion of which is enclosed by an insulating sleeve 12 which is itself secured and clamped in seat 10 by means of a screw 13.

The inner end of metallic holder 11 is connected to the current-carrying lead 14 and through the holder the current enters the brush 9 and so passes to the commutator 2. The outer end of the holder is provided with a transverse wall in which is positioned an opening 15. As shown in Figures 1 and 3 this opening is closed by a removable cap 16 made of a resilient material such as rubber and which is provided with a reduced central portion 17 having a size substantially equal to the seat 15 which is adapted to seat therein. That part of cap 16 immediately forward of portion 17 is transversely enlarged but is of such size that it can be inserted through opening 15 by distortion. Adjacent this enlargement the cap is formed with an integral reduced projection which functions as a spring seat. The main body of cap 16 is slightly larger in its transverse dimension overlying both the metallic holder 11 and the fiber sleeve 12 so that it may be grasped and manually removed with but little trouble. It is believed that the manner of insertion and removal of cap 16 in seat 15 is obvious from the disclosure. With cap 16 in place it forms an outer wall against which the spring 18, carried by the outer head of brush 9, seats and when in place the brush mounting is complete and the brush is urged against the commutator by the spring.

Referring now to Figure 4, in particular, a second preferred embodiment of the invention is disclosed in which the construction is substantially the same as that before described. The metallic holder 11 is again enclosed by a fiber sleeve 12 which is seated within the seat 10 of the stator frame 6. In the present instance, however, the outer end of the holder 11 is provided with an outwardly extending flange or rim instead of a wall provided with a bore in the first embodiment. The cap 16 of the first embodiment has been replaced by a cap 19 which is provided with an inner circular groove 20 which is adapted to enclose and overlie the flange upon member 11 and to secure the cap 20 to that member when in place. Because of the deformable character of the material forming cap 19 the positioning and removal of that member relative to member 11 is believed to be obvious. Cap 19 is also provided with a central bore 21 within which is seated a transversely split metallic member 22 the outer flanged edge of which is seated within a second annular groove 23 in body 19. Member 22 extends rearwardly through body 19 and receives the current-carrying lead 24 which may be secured thereto in any suitable manner as by soldering. With cap 19 in place relative to the remainder of the brush mounting with the outer flange of member 11 seated within groove 20, the spring 18 of brush 9 seats within the metallic cap 22 and the construction functions in the same manner as the first described embodiment.

I claim:

1. A mounting for a commutator brush comprising a frame having a seat, a metallic socket carried by said seat and insulated therefrom, said socket having a transversely extending flange, a cap of resilient insulating material shaped to seat against, cover and protect the end of said socket and to enclose said flange and formed centrally with a spring seat, the relationship being such that it is necessary to manually deform said cap to position and remove it on and from said socket, a current-carrying brush slidably carried in said socket, and a resilient spring seating on said cap and extended between said cap and said brush and urging said brush longitudinally of said socket.

2. A mounting for a commutator brush comprising a frame having a seat, a metallic socket having a reduced open end carried by said seat, a circular inner flange on said socket at a point spaced from said reduced open end, a resilient cap having an encircling circular groove adapted to seat said flange, the portion of said cap forward of said groove being insertable in said socket past said flange by manual deformation and being provided with a spring seat which does not interfere with said deformation, a current-carrying brush slidable in said socket, and a resilient spring between said cap and said brush urging said brush thru said open end.

3. A mounting for a commutator brush comprising a frame having a seat, a metallic socket having an open end carried by said seat, a circular outer flange on said socket, a counterbored resilient cap, a metallic cap seated in said resilient cap and extended centrally therethru at one side, a current-carrying lead connected to the extended end of said metallic cap, a groove in said resilient cap forward of said metallic cap adapted to seat said flange, the portion of said resilient cap forward of said groove being deformable to permit the seating or unseating of said flange in said groove, a current-carrying brush slidable in said socket, and a resilient current-carrying spring between said metallic cap and said brush urging said brush thru the open end of said socket.

4. In combination in a brush mounting, a brush socket having an inwardly extending wall member at one end; a closure cap for a motor brush mounting comprising a body of resilient insulating material, an enlarged head portion at one end adapted to contact and overlie the boundaries of said socket, an encircling channel on said cap immediately adjacent said head portion adapted to seat said wall member, the portion of said cap forward of said channel being manually deformable to permit its entrance into said socket past said wall member, and a forwardly extending portion of reduced size forward of said channel adapted to be encircled by a brush spring and to serve as a seat therefor; a brush in said socket; and a spring seating on said cap and urging said brush from said socket.

VERNON E. CARLSON